3,199,876
STUFFING BOX CONSTRUCTION
John P. Magos, Wilmette, and Kurt B. Bredtschneider and Joseph A. Englert, Chicago, Ill., assignors to Crane Co., Chicago, Ill., a corporation of Illinois
Filed June 10, 1963, Ser. No. 286,695
4 Claims. (Cl. 277—21)

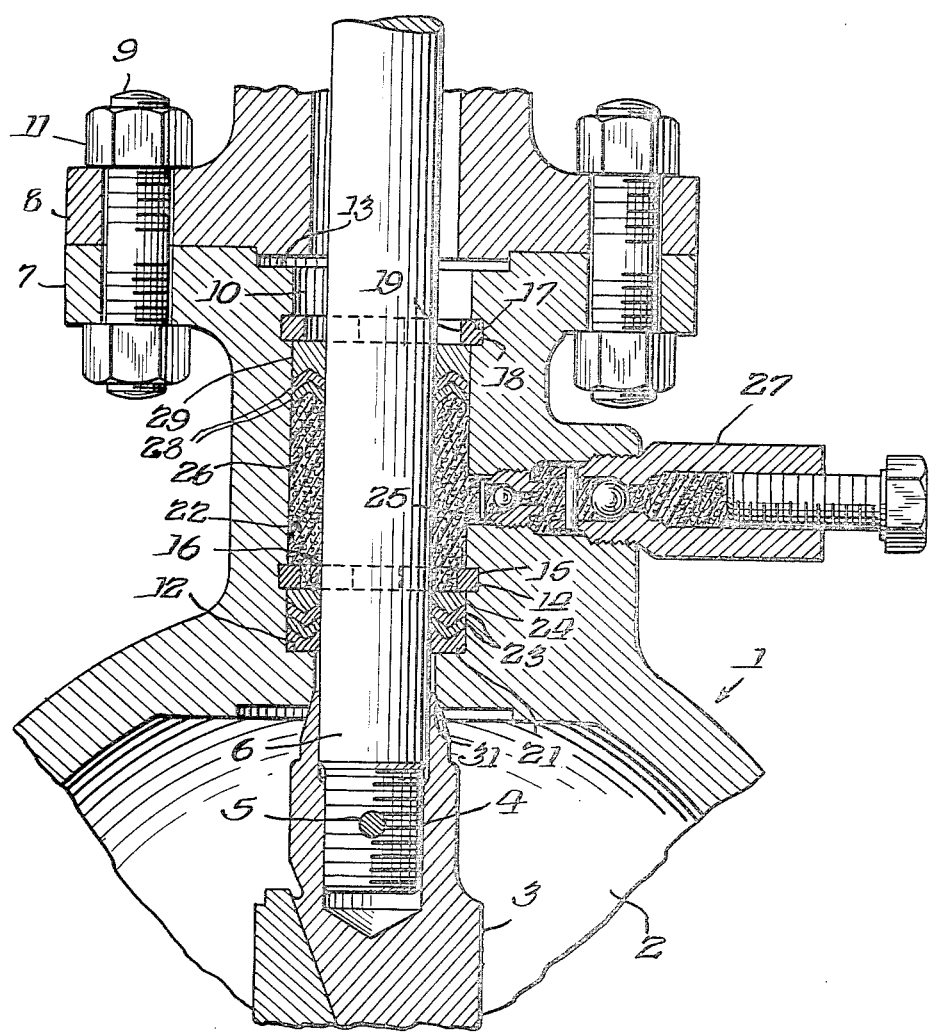
Inventors.
John P. Magos.
Kurt B. Bredtschneider &
Joseph A. Englert.
By Joseph O. Lange United States Patent Office 3,199,876
Patented Aug. 10, 1965

This invention relates generally to a stuffing box construction for valve stems, pressure vessel shafts, such as pumps and the like. More particularly, it is concerned with a novel stuffing box construction in which serious difficulties and failures of the past have been positively overcome.

In order to have a better appreciation of the merits of this contribution, it should be understood that at the present time many stuffing boxes for a wide variety of services employ plastic packings. This construction at upper and lower limits of the stuffing box employs wiping rings for the packing of a V-formed leather, composition, synthetics and similar flexible materials with metal backing rings or supports for the said V-rings.

Actually in the course of service, the plastic packing may become badly worn or dissipated and it then becomes necessary to inject replacement packing or additional packing through a suitable packing feeder means. If such replenishment or replacement of the packing is not done sufficiently early to substantially replace the reduced volume of the packing material within the stuffing box chamber, it will be appreciated that the end positioned V-rings or those closest to the fluid pressure source under the influence of line fluid pressure within the vessel chamber will move said V-rings in a direction sufficient to overlie and to block the feeder hole. Such disarrangement of the V-rings will prevent the entry of the new packing and obviously create a serious situation.

It will be realized that under such prior conditions frequently the packing will lose its normal elasticity and thus has to be removed from the stuffing box together with the damaged V-packing rings and the accompanying back-up rings. Ordinarily, such repacking is necessarily done in service while the valve stem is backseated. For this reason, it is not practical to retain the end disposed wiping rings in place by a screwed-in metal ring or bushing because the threads on the end limit of the stuffing box chamber can easily be damaged during the replacement of the packing and the wiping rings therefor. Further, a screwed-in back-up ring can easily become loosened in the course of service on valves employing a rotating stem which makes them objectionable.

Therefore, it is one of the more important objects of this invention to overcome these difficulties.'

One of the more important objects is to provide for a stuffing box construction in which no threaded areas are required within the stuffing box itself.

Further, it is an object to provide end disposed back-up rings together with V-rings and back-up supporting rings conveniently and easily retained in position by means of easily attachable and removable split rings positioned in corresponding grooves within the stuffing box in an arrangement hereinafter to be described in greater detail.

Another object is to provide for a stuffing box construction in which substantially identical split rings are positioned in grooves at substantially opposite end limits of the stuffing box whereby to hold the V-rings and the back-up rings firmly and accurately in position.

Thus it is of prime importance to provide by this invention a construction and method by means of which an introduction of new packing, say, of the order of a plastic material, cannot become blocked or become so restricted as to interfere with the ready replacement or replenishment of the packing within the stuffing box.

A further object is to provide a stuffing box construction in which the volume of the stuffing box annular space for the packing remains substantially constant irrespective of the severity of the service to which the valve, pump or similar pressure vessel may be exposed.

Other objects and advantages will become more readily apparent upon proceeding with the description of the invention in which the single figure shows a fragmentary sectional assembly view of a preferred form of a stuffing box construction embodying our invention.

Referring now to the figure, a conventional valve bonnet generally designated 1 is shown, provided at its lower chamber portion 2 thereof with a reciprocally movable closure member 3 attached as at 4 by means of the pin 5 to a valve stem 6. The stem 6 projects through an upper relieved portion or chamber in the bonnet as illustrated at 10. The top end portion of the bonnet 1 is provided with a yoke flange 7 to which the yoke 8 is attached by means of the usual studs 9 and the nuts 11. The said relieved portion or chamber 10 of the bonnet is provided with a lower annular shoulder 12. Thus, the said relieved portion 10 has its upper and lower end limits defined.

At its upper limit, the chamber 10 is defined by a transverse annular surface 13 which may be recessed as indicated in order to center the yoke 8 with relation to the bonnet 1. At a suitable predetermined distance from the inner annular transverse shoulder surface 12, a back-up ring, preferably of metal, designated 21 is slidably inserted between the outside diameter of the stem 6 and the inside diameter of the stuffing box 22 as shown. A plurality of V-formed packing rings, which may be either of rubber, leather, or other composition, are superimposed as indicated at 23, the number varying with the kind of service. Immediately abutting against the V-formed packing is the filler ring, preferably of metal, designated 24, with its undersurface formed to substantially coincide with the adjacent V-ring. On its upper or outer surface portion, said filler ring will bear against the snap ring 15 which serves to hold the assembly of the ring members 21, 23, and 24 in position. As shown in the figure, the snap-ring snugly bearing against the lower annular surface 14 holds said assembly firmly against displacement or loss and in so doing locks it firmly in position so as not to block the feeder opening 25 at any time.

Immediately above and extending within the aperture 16 of the snap ring 15 of the usual split type, a suitable plastic packing is applied as indicated at 26 by means of a feeder fitting 27 of the usual type employed for injecting plastic packing into a stuffing box. This is of the type shown more clearly on page 131 of the No. 60 Catalog of Crane Co., Chicago, Illinois. At a suitable predetermined position at the opposite and upper end portion of the stuffing box 22, a plurality of similarly constituted V-packing rings 28 are provided cooperating with the back-up supporting ring 29 formed as indicated to receive the V-rings 28. In a similar manner to that described in connection with the ring member 24, the said back-up ring member 29 is received within the stuffing box 22 and in abutting relation bears against the upper or outer snap-ring 18 snugly bearing against the upper annular surface 17 in the manner illustrated. Preferably, but not necessarily, the surface 19 defines the inner annular limits of the ring 18 overlying the supporting ring 29.

It will be appreciated that the snap rings 15 and 18 are of the split type as indicated by the dotted lines and can easily be removed whenever necessary by means of suitable tools for engagement of the rings when such removal becomes necessary.

Considering the operation of this novel stuffing box construction with the respective upper and lower back-up rings 29 and 21 in position together with the V-packing rings 23 and 28, it will be apparent that upon the introduction of the plastic packing by means of the feeder fitting 27 through the opening 25 communicating directly with the stuffing box 22, the feeding of such packing will continue to create a fluid pressure condition within the stuffing box. In the case of the inner or lower snap ring 15 actually the plastic being introduced will flow within the area defined by the aperture 16 of the snap-ring and thus create a pressure condition against the back of the ring 24. Similarly, fluid pressure created by the packing 26 will bear against the inner one of the V-formed members 28 thereby to cause the latter members to move longitudinally slightly and also to spread to create fluid seals between the outside diameter of the valve stem 6 and the inside diameter of the stuffing box 22. It should, of course, be realized that the valve closure member designated 3 in the backseating position shown at 31 will normally prevent the escape of line fluid from the valve chamber 2 into the stuffing box 22 when the valve is in its full open or backseated position as shown. However, if the backseating at 31 should become defective for any reason and line fluid does escape past the surface portion 31 or the valve closure 3 is in an intermediate position including a seated valve, line fluid pressure will enter the stuffing box, move past the surface 12 and thus create a pressure condition whereby the V-formed rings 23 will be suitably deformed to provide fluid seals between the inside diameter of the stuffing box 22 and the outside diameter of the stem 6.

However, more importantly, it should be realized that under any and all circumstances, the V-formed rings 23 together with the back-up rings or supports 21 and 24 will be positively held against any axial movement within the stuffing box in a direction toward the transverse aperture or passage 25. It will be realized that if such packing movement as described were to occur the aperture from the feeder fitting 27 could be substantially blocked and thereby prevent the entry or introduction of new plastic packing as replacement or renewal is required. Thus the snap ring 15 serves the very important function of positively preventing any substantial axial movement of the packing ring assembly consisting of the members 21, 23, and 24 past the snap ring 15. It will accordingly become apparent that the construction effectively accomplishes the important objective preventing the blocking of the feed passage 25 under any and all circumstances.

It will further be appreciated that under the normal feed of plastic packing into the stuffing box chamber 22, the outer or upper V-formed rings 28 are frictionally held against any movement axially toward the opening 25 and are held in a firmly compressed condition by reason of the support against axial movement provided by the snap ring 18.

While only a single embodiment has been shown and described, it will be appreciated that the invention is capable of being used in a variety of forms other than that illustrated and described.

We claim:

1. A stuffing box construction for a bonnet or the like comprising a shaft and a bonnet, said bonnet having an upper relieved portion consisting of an annular chamber for the shaft around a longitudinal portion thereof, upper and lower snap-rings substantially defining the respective end limits of the said chamber, the said snap-rings fitting within annular grooves of the chamber and being axially immovable relative to said chamber, plastic packing filling at least an intermediate portion of the said chamber between said end limits, a plurality of V-rings cooperating with the upper one of said snap-rings to define the said upper end limit of the chamber, the remainder of said V-rings being disposed at substantially an opposite and lower end of the chamber, the latter V-rings being mounted in the lower portion of the chamber below said lower snap-ring, pressure feed means for supplying said plastic packing to the intermediate portion of said annular chamber, an end disposed back-up ring and a filler ring within the chamber below the said lower snap ring cooperating with the said V-rings at said lower end of the chamber whereby upon the application of fluid pressure by the plastic packing feed means to the intermediate portion of the said chamber the said V-rings are acted upon and moved slightly axially in opposite directions.

2. The subject matter of claim 1, the said snap ring in the lower portion of the chamber having a central aperture around the said shaft to provide for the passage of said plastic packing past said lower snap-ring whereby to apply fluid pressure against said filler ring and V-rings.

3. The subject matter of claim 1, the said snap ring in the lower portion of the chamber being fixedly positioned in the said chamber to provide an annular space above the lower end limit of the chamber at least sufficient to accommodate the back-up ring, the lower V-rings and the filler ring.

4. A stuffing box construction comprising a shaft and bonnet, said bonnet having an upper relieved portion consisting of an annular chamber for the shaft around at least a longitudinal portion thereof, upper and lower snap-rings substantially defining the respective end limits of the said chamber, the said snap-rings fitting within annular grooves encircling said chamber in spaced apart relation and being substantially axially immovable relative to said chamber, a plurality of V-rings cooperating with one of said snap-rings to define one end limit of the chamber, the remainder of said V-rings being disposed at substantially an opposite and lower end of the chamber, the V-rings being disposed in the chamber beyond said lower snap-ring, pressure feed means for supplying packing to the said annular chamber, end disposed back-up rings and a filler ring within the chamber cooperating with the said V-rings, the upper one of said back-up rings bearing against an inner annular portion of the upper snap ring, the lower one of said back-up rings bearing against the lower end limit of the annular chamber, plastic packing filling that portion of said chamber between said snap-rings except for the portions occupied by the said V-rings and back-up ring, the said lower snap ring inhibiting axial movement of the lower back-up ring, V-rings and filler ring beyond said lower snap ring under influence of line fluid pressure whereby upon application of fluid pressure by the plastic packing feed means to the said chamber the said V-rings are moved slightly axially in opposition directions, the said filler ring and certain of said V-rings being disposed between said lower snap ring and said lower back-up ring defining the lower end of the said chamber.

References Cited by the Examiner

UNITED STATES PATENTS

| | | |
|---|---|---|
| 2,319,543 | 5/43 | Hall. |
| 2,504,936 | 4/50 | Payne _____ 277—62 |
| 2,711,333 | 6/55 | Rodgers _____ 277—205 X |
| 2,731,282 | 1/56 | McManus et al. _____ 277—21 |
| 2,992,028 | 7/61 | Knox _____ 277—1 |
| 3,091,470 | 5/63 | Anderson et al. |

LEWIS J. LENNY, *Primary Examiner.*

SAMUEL ROTHBERG, *Examiner.*